(12) United States Patent
La

(10) Patent No.: US 6,318,709 B1
(45) Date of Patent: Nov. 20, 2001

(54) UPPER SEAT STRUCTURE FOR REAR COIL SPRING

(75) Inventor: Min-Hwan La, Gwacheon-shi (KR)

(73) Assignee: Kia Motors Corporation, Kwangmyong (KR)

(*) Notice: Subject to any disclaimer, the term of this patent is extended or adjusted under 35 U.S.C. 154(b) by 0 days.

(21) Appl. No.: 09/723,245

(22) Filed: Nov. 28, 2000

(30) Foreign Application Priority Data

Dec. 21, 1999 (KR) .................................................. 99-60025

(51) Int. Cl.[7] .................................................. F16F 11/00
(52) U.S. Cl. ............................ 267/220; 280/124.147
(58) Field of Search ........................... 267/220, 221, 267/222; 280/124.155, 124.147, 781, 788, 124.15, 124.1, 124.139

(56) References Cited

U.S. PATENT DOCUMENTS

| | | | |
|---|---|---|---|
| 2,935,334 | * 5/1960 | Felts ............................ | 280/124.147 |
| 4,093,253 | 6/1978 | Lehr . | |
| 4,618,127 | 10/1986 | Le Salver et al. . | |
| 4,630,803 | 12/1986 | Werner et al. . | |
| 5,330,166 | 7/1994 | Aoki . | |
| 5,382,044 | * 1/1995 | Smith et al. ............................ | 280/788 X |
| 5,536,035 | * 7/1996 | Bautz et al. ............................ | 280/124.139 |
| 5,678,844 | 10/1997 | Dassler et al. . | |
| 6,135,498 | * 10/2000 | Vlahovic ............................ | 280/788 |

* cited by examiner

Primary Examiner—Robert J. Oberleitner
Assistant Examiner—Melanie Torres
(74) Attorney, Agent, or Firm—Birch, Stewart, Kolasch & Birch, LLP

(57) ABSTRACT

Disclosed is an upper seat structure for a rear coil spring, which is arranged on a side frame member so as to support an upper portion of the rear coil spring installed on a rear axle and thereby to prevent occupant's comfort from being degraded due to vibration generated while a motor vehicle runs. The upper seat structure comprises an inner seat part; an outer seat part, the inner and outer seat parts being disposed on an inner side surface of the side frame member; a pair of cross members extending, parallel to each other, through a wall of the side frame member into a space defined in the side frame member; and a reinforcing plate coupled at both ends thereof to the pair of cross members, respectively, thereby to support the inner and outer seat parts, the reinforcing plate being formed with at least one reinforcing bead.

3 Claims, 2 Drawing Sheets

UPPER SEAT STRUCTURE FOR REAR COIL SPRING

BACKGROUND OF THE INVENTION

1. Field of the Invention

The present invention relates to an upper seat structure for a rear coil spring, and more particularly, the present invention relates to an upper seat structure for a rear coil spring, which supports an upper portion of the rear coil spring arranged on a rear axle for improving a function of a rear suspension.

2. Description of the Related Art

In a motor vehicle, a suspension serves to absorb vibration which is generated while the motor vehicle runs and thereby improve occupant's comfortableness upon being seated. Referring to FIG. 1, there is shown an upper seat for a rear coil spring, which supports an upper portion of the rear coil spring arranged on a rear axle of a motor vehicle.

As shown in FIG. 1, the upper seat 11 for the rear coil spring 13, which functions to support the upper portion of the rear coil spring 13 arranged on the rear axle (not shown), is provided on an inner side surface of each of a pair of side frame members 12 which are respectively positioned at both sides of the motor vehicle and extend in a lengthwise direction of the motor vehicle. The upper seat 11 possesses a plurality of bracket parts 14 which are formed along side and upper edges thereof. When the upper seat 11 is installed on the side frame member 12, the plurality of bracket parts 14 are welded to the side frame member 12.

However, the upper seat for the rear coil spring, constructed as mentioned above, suffers from defects as described below. That is to say, since the plurality of bracket parts are welded to the side frame member, when spring force of the rear coil spring acts in upward and downward directions, a moment is applied to the upper seat by load which is transferred from the rear coil spring, depending upon a distance between a load-exerting point and a securing point of the upper support. As a consequence, in the case that the load which is transferred from the rear coil spring to the upper seat, is substantial, that is, when a large moment is applied to the upper seat, the upper seat is deformed in a direction where the moment is applied thereto, whereby the plurality of bracket parts which are welded to the side frame member, are apt to be broken.

SUMMARY OF THE INVENTION

Accordingly, the present invention has been made in an effort to solve the problems occurring in the related art, and an object of the present invention is to provide an upper seat structure for a rear coil spring, which is configured in such a way as to fundamentally eliminate a possibility of parts of the upper seat, welded to a side frame member, to be broken by spring force applied to the upper seat due to vibration generated while a motor vehicle runs.

In order to achieve the above object, according to one aspect of the present invention, there is provided an upper seat structure for a rear coil spring, which is arranged on a side frame member so as to support an upper portion of the rear coil spring installed on a rear axle and thereby to prevent occupant's comfortableness from being degraded due to vibration generated while a motor vehicle runs, the upper seat structure comprising: an inner seat part inserted into the rear coil spring; an outer seat part surrounding the upper portion of the rear coil spring, the inner and outer seat parts being disposed on an inner side surface of the side frame member; a pair of cross members respectively located in front of and behind the upper portion of the rear coil spring, the pair of cross members extending, parallel to each other, through a wall of the side frame member into a space defined in the side frame member; and a reinforcing plate coupled at both ends thereof to the pair of cross members, respectively, thereby to support the inner and outer seat parts, the reinforcing plate being formed with at least one reinforcing bead which serves to elevate strength of the reinforcing plate.

According to another aspect of the present invention, it is preferred that a distance between the inner and outer seat parts be slightly larger than a wire diameter of the rear coil spring so as to allow the rear coil spring to be easily rested on the outer seat part.

According to still another aspect of the present invention, the reinforcing bead is formed on the reinforcing plate in such a way as to extend in a lengthwise direction of the motor vehicle.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
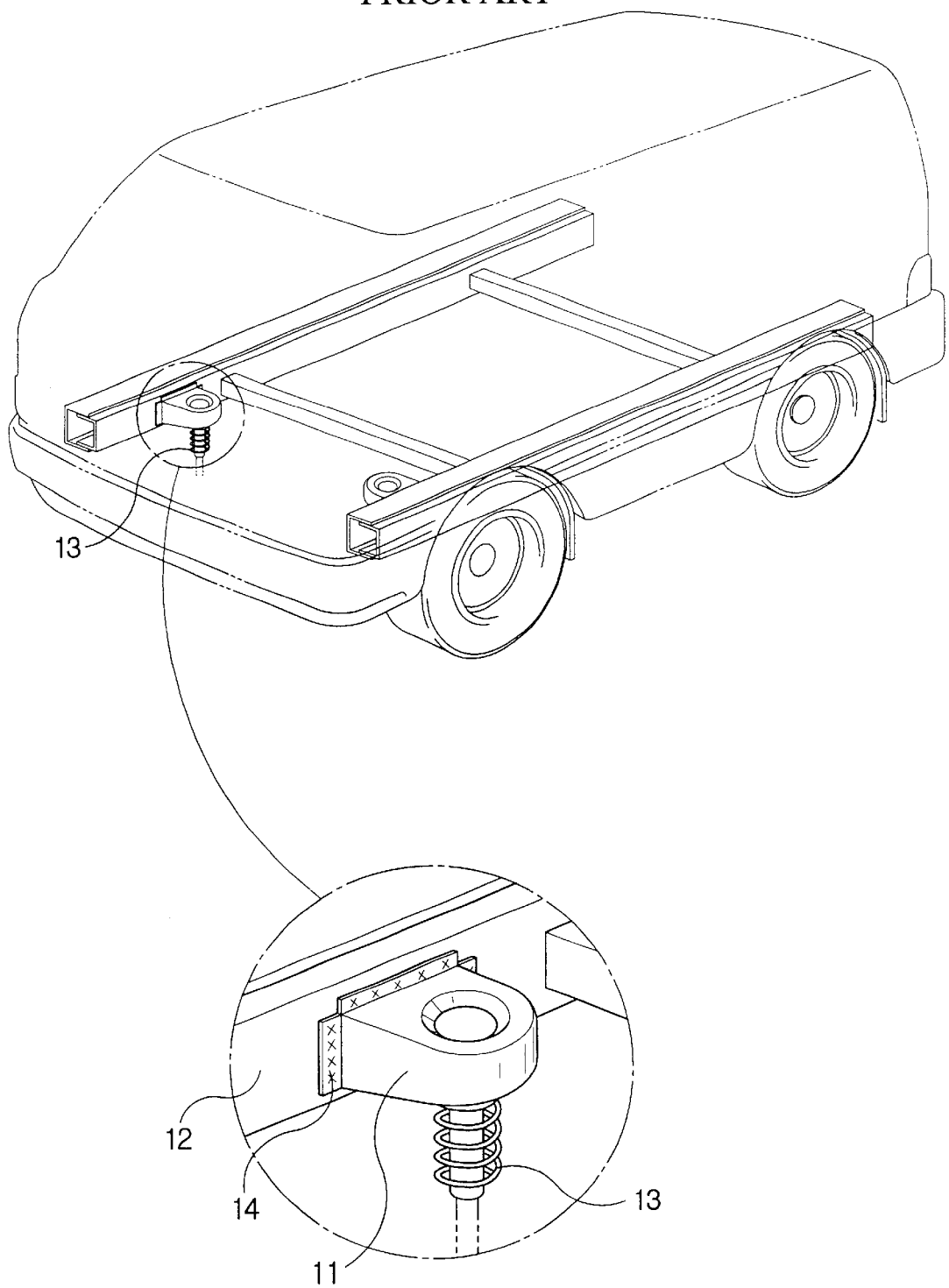
FIG. 1 is a perspective view illustrating a conventional upper seat for a rear coil spring, which is installed on a side frame member.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
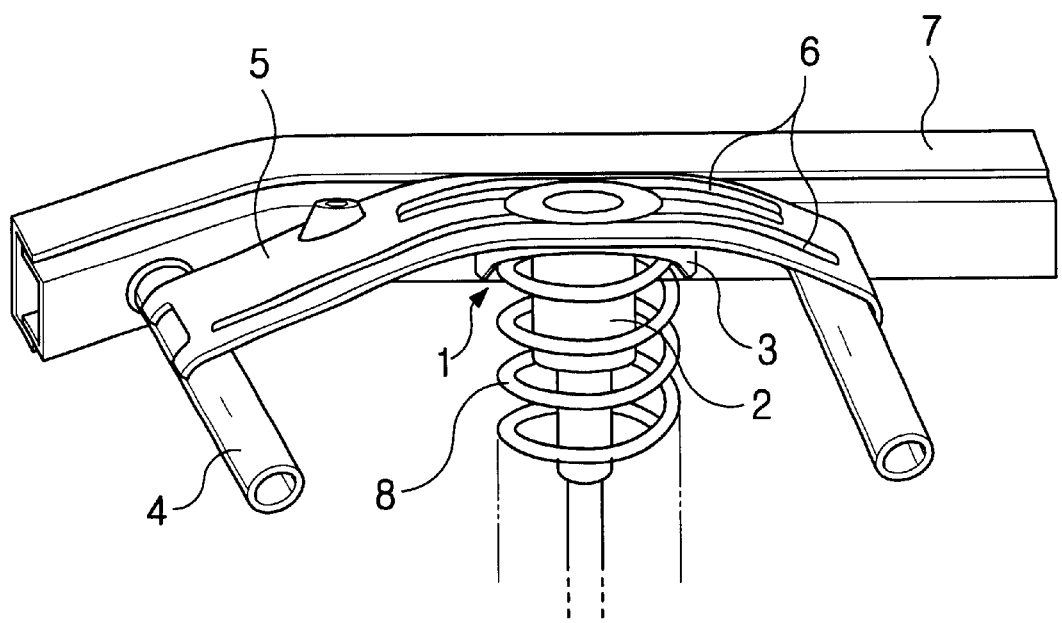
FIG. 2 is a perspective view illustrating an upper seat structure for a rear coil spring, which is installed on a side frame member, in accordance with an embodiment of the present invention.

FIG. 2 is a perspective view illustrating an upper seat structure for a rear coil spring, which is installed on a side frame member, in accordance with an embodiment of the present invention. As shown in FIG. 2, an upper seat structure according to the present invention, is provided on an inner side surface of a side frame member 7 and includes an upper seat 1. The upper seat 1 has an inner seat part 2 which is inserted into a rear coil spring 8 installed on a rear axle and an outer seat part 3 which surrounds an upper portion of the rear coil spring 8.

Accordingly, the upper portion of the rear coil spring 8 is rested on the upper seat part 3 in a state wherein the inner seat part 2 is inserted into the rear coil spring 8, whereby the rear coil spring 8 is prevented from being fluctuated in forward, rearward, leftward and rightward directions. To this end, a distance between the inner and outer seat parts 2 and 3 is established to be slightly larger than a wire diameter of the rear coil spring 8.

Preferably, a pair of cross members 4 are respectively provided in front of and behind the upper seat 1. The pair of cross members 4 extend parallel to each other through a wall of the side frame member 7 into a space which is defined in the side frame member 7. A reinforcing plate 5 is coupled at both ends thereof to the pair of cross members 4, respectively. The reinforcing member 5 serves to support an upper portion of the upper seat 1 so as to elevate strength of the upper seat 1.

On the other hand, the reinforcing plate 5 is formed with a plurality of reinforcing beads 6 which project upward or downward from a surface of the reinforcing plate 5 so as to elevate strength of the reinforcing plate 5. The plurality of reinforcing beads 6 are formed in such a way as to extend in a lengthwise direction of a motor vehicle, that is, the reinforcing plate 5. Thus, a surface area which is occupied by the plurality of the reinforcing beads 6, can be increased in the reinforcing plate 5.

By the upper seat structure for a rear coil spring according to the present invention, constructed as mentioned above, advantages are provided as described below. Since the pair of cross members are provided in a manner such that they are respectively located in front of and behind an upper seat on which an upper portion of a rear coil spring is rested and they extend parallel to each other through a wall of a side frame member into a space defined in the side frame member, when spring force acting in upward and downward directions is applied to the upper seat, it is possible to prevent the side frame member from being twisted due to the spring force.

Furthermore, by the fact that a reinforcing plate is coupled at both ends thereof to the pair of cross members so as to support an upper portion of the upper seat, spring force which is applied to the upper seat, is dispersed over the reinforcing plate and the pair of cross members, whereby it is possible to prevent welded parts from being broken due to stress concentration.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An upper seat structure for a rear coil spring, which is arranged on a side frame member so as to support an upper portion of the rear coil spring installed on a rear axle and thereby to prevent occupant's comfortableness from being degraded due to vibration generated while a motor vehicle runs, the upper seat structure comprising:

an inner seat part inserted into the rear coil spring;

an outer seat part surrounding the upper portion of the rear coil spring, the inner and outer seat parts being disposed on an inner side surface of the side frame member;

a pair of cross members respectively located in front of and behind the upper portion of the rear coil spring, the pair of cross members extending, parallel to each other, through a wall of the side frame member into a space defined in the side frame member; and a reinforcing plate coupled at both ends thereof to the pair of cross members, respectively, thereby to support the inner and outer seat parts, the reinforcing plate being formed with at least one reinforcing bead which serves to elevate strength of the reinforcing plate.

2. The upper seat structure as claimed in claim 1, wherein a distance between the inner and outer seat parts is slightly larger than a wire diameter of the rear coil spring.

3. The upper seat structure as claimed in claim 1, wherein the reinforcing bead is formed on the reinforcing plate in such a way as to extend in a lengthwise direction of the motor vehicle.

* * * * *